Patented Jan. 6, 1925.

1,521,947

UNITED STATES PATENT OFFICE.

WARD L. HARRIS, OF SALINA, KANSAS, ASSIGNOR TO THE LEE HARDWARE COMPANY, OF SALINA, KANSAS, A CORPORATION OF KANSAS.

BINDER FOR TABLETS AND PROCESS OF MAKING THE SAME.

No Drawing.  Application filed November 26, 1921. Serial No. 518,075.

*To all whom it may concern:*

Be it known that I, WARD L. HARRIS, of Salina, in the county of Saline and State of Kansas, have invented certain new and useful Improvements in Binders for Tablets and Processes of Making the Same; and I do hereby declare the following to be a full, clear, and exact description of the invention, such as will enable others skilled in the art to which it appertains to make and use the same.

My invention relates to a composition of matter and method of making the same to be used in binding together a series of leaves of paper or other material into books, tablets, pads, etc., similar to such as are described and claimed in Letters Patent No. 1,341,782, granted June 1, 1920.

An object of my invention is the production of a compound which adheres better to the back of the tablet or pad when the sheets or pages are removed one at a time by tearing them away.

Another object of my invention is the production of a compound which, when properly applied, will not accumulate on, and adhere to, the edge of a sheet or page, but will remain at the back of the tablet.

Another object of my invention is the intimate mixing of glue and rubber.

Other objects will be apparent from an understanding of my invention.

In the before noted patent there is described a "tabbing compound which is a rubber-like mass and is preferably made as follows: 35 parts of smoked plantation or fine Para raw rubber and the same amount of unsmoked first latex or best grade unsmoked plantation raw rubber are thoroughly mixed together by passing them through suitable high tension crushing rollers heated to a blood heat, then about 10 parts of silica oxide or magnesium carbonate or fossil flour, 13 parts of calcium carbonate, 6 parts of calcium hydroxid and 1 part of coloring matter are added and thoroughly incorporated and mixed with the rubber. This operation requires approximately fifteen minutes. 70 gallons of a suitable solvent consisting of about 70 parts of carbon tetrachlorid and 30 parts of benzol are placed in a mixing drum and into this 100 pounds of the rubber composition is dropped and thoroughly stirred. About one ounce of deodorant is added for each gallon of solvent, this deodorant cc ; sisting of equal parts, oil of cloves, preferably C. P., and of gum camphor, preferably C. P. The fillers used should be very fine and the calcium carbonate should be amorphous. The composition is then ready to be applied.

"The silica oxide or magnesium carbonate or fossil flour and calcium carbonate are to a great extent equivalents of each other in that they give bulk to the composition without detracting from its binding qualities unless used in too great excess.

"I prefer the proportions of the various ingredients as given above but these may be varied to a great extent without departing from the spirit of my invention and some of the ingredients may even be omitted provided a composition is obtained which is flexible, elastic, yieldable and which will not remain tacky or become brittle.

"Any suitable solvent for rubber may be used but I prefer that indicated above on account of its non-inflammability and because it leaves the film of applied rubber free from tackiness in a short time.

"The composition resulting from the process set forth is homogeneous in that it is of a uniform nature throughout, having no separate elements, layers or structures."

My present invention is an improvement over the subject matter of this patent, and results in the accomplishment of the above enumerated and other objects.

I practice my invention by intimately intermixing equal qualities of first latex rubber and glue which is made from bones twenty-four hours after the death of the animal, the glue being well incorporated into the rubber. While this time limit may be varied an hour or two either way, the glue is best made within a twenty-four hour limit. Bones undergo certain chemical changes after twenty-four hours following the death of the animal which causes the glue made therefrom to be far inferior for my purposes than glue made within twenty-four hours after death.

I thus produce a very efficient binding material to which the filler ingredients above mentioned may be added if so desired, and I prefer to add the same filler ingredients, and in the same proportions, and in the same manner as above specified.

My material made of rubber and of glue made within the time limit specified by the process so far described may be used as such, but I find that somewhat better results are obtained by using 50% thereof with 50% of the binding material described in the patent above mentioned. This mixture of equal parts of each may be prepared either before or after the addition of the solid filler portions of the binder. In other words, I may omit the filler material referred to in the prior patent and use only the rubbery binder part thereof, and mix the same with equal amount of my specially prepared composition comprising rubber and glue made from bones within twenty-four hours after the death of the animal. Or I may suitably mix together the complete composition, as set forth in the prior patent, with the above described composition comprising rubber and glue made from bones within twenty-four hours after the death of the animal, and additional filler materials may, if desired, be added in the amounts and proportions set forth in said patent. I prefer to mix equal quantities of the composition comprising rubber and glue made from bones within twenty-four hours after the death of the animal and the complete composition as set forth in the prior patent.

As stated above, I find that the intermixture of the rubber glue should be an intimate one and I have discovered that this can be easily prepared by incorporating the glue in practically dry or anhydrous condition into the rubber, preferably by milling it thereinto. Ordinary glue contains about 16% of moisture. I dry my glue and incorporate it into the rubber by sprinkling the dry powdered glue over the rubber while the same is being milled between high tension crushing rollers maintained at a blood heat, whereby the glue is incorporated into the rubber, and I prefer to add the powdered glue a little at a time to the rubber being worked in the rolls as this tends to produce a more uniform composition. Should the glue as added not be sufficiently dry the water therein will be evaporated by the heat of the rolls which are maintained at a blood heat by the effect of their action on the mass being rolled, further heat being supplied to the rolls as may be necessary by means well known in the art. Thus if the glue is too moist, it is simultaneously dried and worked into the rubber, while if it is added to the rubber in a dry condition it is quickly worked into the rubber by the rolls. I found that the glue should be dry in order that it may be well worked into the rubber and that it will not compound properly with the rubber if it contains more than a trace of water.

My new compound comprising the special glue as stated above may be used as such, preferably together with the filling materials and in the proportions above described, but I do not wish to be limited to the use thereof, as stated. I prefer, however, to mix my new compound with the old compound described in the aforesaid patent and these may be mixed in varying proportions of new to old compound; I find, however, that 50% of each produces an excellent tabbing compound, according to which the rubber and glue are present in the proportions respectively of three (3) to one (1). The ingredients may be directly combined in these proportions, but I prefer to take equal quantities of the old compound described in my aforesaid patent and of my previously mixed new compound and mill them together for a few minutes running the resulting mass off in sheets which I cut into pieces which are then treated in a churn with the necessary solvent until the whole mass is homogeneous and of the proper consistency.

The proportions of equal quantities of glue and rubber in my preliminary compound which is to be admixed with the rubber compound, but which if desired may be used as such, should be strictly adhered to as I have found that trying to mill together 50 lb., of rubber and 51 lbs. of glue will result in a more or less crumbly mixture, while if 50 lbs. of rubber and 50 lbs. of glue are milled together, the result is a rather tenacious mass.

My tabbing compound comprising the rubber, glue, filling materials, and solvent, is a sticky fluid which is applied at ordinary room temperature. If it should be too thin some of the solvent may be allowed to evaporate off, while if it is too thick the addition of further solvent will bring it to the desired consistency.

It is to be understood, of course, that the proportions of the inert filling materials as well as those having a caustic nature, and the coloring matter, may be varied to a great extent, and in fact they, or some of them, may be omitted entirely; but I prefer a compound in which they are included in substantially the proportions stated.

By the word "glue" as used in the appended claims I mean the specially prepared glue described above.

I claim as my invention:

1. The method of compounding glue with rubber, which comprises milling a mixture of rubber and glue.

2. The method of compounding glue with rubber, which comprises milling a mixture of rubber and dry glue.

3. The method of compounding glue with rubber, which comprises dusting powdered glue on the rubber and milling it therein.

4. The method of compounding glue with rubber, which comprises dusting dry powdered glue on the rubber and milling it therein.

5. The method of compounding glue with rubber, which comprises milling glue and rubber between rollers heated to a blood heat.

6. The method of compounding glue with rubber, which comprises milling dry glue and rubber between rollers heated to a blood heat.

7. The method of compounding glue with rubber, which comprises milling rubber at a blood heat and dusting the required amount of powdered glue thereon in small amounts at a time during the milling.

8. The method of compounding glue with rubber, which comprises milling rubber at a blood heat and dusting the required amount of dry powdered glue thereon in small amounts at a time during the milling.

9. A tabbing compound comprising rubber and glue made from bones within twenty-four hours after the death of the animal.

10. A tabbing compound comprising rubber and glue made from bones within twenty-four hours after the death of the animal in the proportions respectively of three (3) to one (1).

11. A tabbing compound comprising rubber, glue made from bones within twenty-four hours after the death of the animal and a filling material.

12. A tabbing compound comprising rubber, glue made from bones within twenty-four hours after the death of the animal and a rubber solvent.

13. A tabbing compound comprising rubber, glue made from bones within twenty-four hours after the death of the animal, filling material and a rubber solvent.

14. A tabbing compound comprising 105 parts of rubber, 35 parts of glue, 10 parts of filling material, 13 parts of calcium carbonate, and 6 parts of calcium hydroxid.

15. A tabbing compound comprising 105 parts of rubber, 35 parts of glue, 10 parts of filling material, 13 parts of calcium carbonate, 6 parts of calcium hydroxid, and 1 part of coloring matter.

16. A tabbing compound comprising 105 parts of rubber, 35 parts of glue, 10 parts of filling material, 13 parts of calcium carbonate, 6 parts of calcium hydroxid, and about 70 gallons of solvent for each 100 pounds of solid composition.

17. A tabbing compound comprising 105 parts of rubber, 35 parts of glue, 10 parts of filling material, 13 parts of calcium carbonate, 6 parts of calcium hydroxid, 1 part of coloring matter, and about 70 gallons of solvent for each 100 pounds of solid composition.

18. A tabbing compound comprising 105 parts of rubber, 35 parts of glue, 10 parts of filling material, 13 parts of calcium carbonate, 6 parts of calcium hydroxid, and about 70 gallons of a mixture consisting of 70% of carbon tetrachlorid and 30% of benzol for each 100 pounds of solid composition.

19. A tabbing compound comprising 105 parts of rubber, 35 parts of glue, 10 parts of filling material, 13 parts of calcium carbonate, 6 parts of calcium hydroxid, 1 part of coloring matter, and about 70 gallons of mixture consisting of 70% of carbon tetrachlorid and 30% of benzol for each 100 pounds of solid compositions.

20. The process of making a tabbing compound which comprises incorporating glue into rubber, and then incorporating a rubber containing composition into the resulting composition.

21. The process of making a tabbing compound which comprises incorporating equal quantities of glue and rubber into each other, and then incorporating a rubber containing composition into the resulting composition.

22. The process of making a tabbing compound which comprises incorporating equal quantities of glue and rubber into each other, and then incorporating a like quantity of a rubber containing composition into the resulting composition.

23. The process of making a tabbing compound which comprises milling together equal parts of rubber and glue and milling a filling material thereinto to form a first preliminary composition, milling a filling material into rubber to form a second preliminary composition, and milling the two preliminary compositions together.

24. The process of making a tabbing compound which comprises milling together equal parts of rubber and glue and milling a filling material thereinto to form a first preliminary composition, milling a filling material into rubber to form a second preliminary composition, and milling the two preliminary compositions together, and treating the resulting mass with a suitable solvent.

In testimony whereof I have signed this specification.

WARD L. HARRIS.